US009694459B2

(12) United States Patent
Kakutani et al.

(10) Patent No.: US 9,694,459 B2
(45) Date of Patent: Jul. 4, 2017

(54) CHIP DISCHARGE DEVICE OF MACHINE TOOL

(71) Applicant: DMG MORI CO., LTD., Nara (JP)

(72) Inventors: Masahide Kakutani, Nara (JP); Ryutaro Oshima, Nara (JP)

(73) Assignee: DMG MORI CO., LTD., Yamatokoriyama-Shi, Nara (JP)

( * ) Notice: Subject to any disclaimer, the term of this patent is extended or adjusted under 35 U.S.C. 154(b) by 0 days.

(21) Appl. No.: 15/165,212

(22) Filed: May 26, 2016

(65) Prior Publication Data

US 2016/0354887 A1 Dec. 8, 2016

(30) Foreign Application Priority Data

Jun. 4, 2015 (JP) ................. 2015-113662

(51) Int. Cl.
| B65G 21/14 | (2006.01) |
| B65G 19/04 | (2006.01) |
| B23Q 11/02 | (2006.01) |
| B23Q 11/00 | (2006.01) |
| B01D 21/24 | (2006.01) |
| B01D 21/00 | (2006.01) |

(52) U.S. Cl.
CPC ...... *B23Q 11/0057* (2013.01); *B01D 21/0012* (2013.01); *B01D 21/2455* (2013.01); *B23Q 11/0067* (2013.01)

(58) Field of Classification Search
CPC ........................... B65G 11/20; B23Q 11/0067
USPC .................. 198/493, 495, 716, 861.1, 861.2; 210/298, 400, 772, 783
See application file for complete search history.

(56) References Cited

U.S. PATENT DOCUMENTS

| 5,078,256 A * | 1/1992 | Hatano ................. B23H 1/00 198/360 |
| 5,167,839 A * | 12/1992 | Widmer, II ........ B01D 21/2455 198/716 |
| 5,603,846 A * | 2/1997 | Uchiyama ............ B01D 33/073 210/167.09 |
| 5,961,847 A * | 10/1999 | Creps ..................... B01D 29/01 210/400 |
| 5,992,642 A * | 11/1999 | Ota ........................ B01D 33/04 210/394 |
| 6,066,255 A * | 5/2000 | Anderson .............. B01D 33/04 210/297 |
| 6,332,983 B1 * | 12/2001 | Tashiro ............. B23Q 11/0057 210/295 |
| 6,601,691 B1 * | 8/2003 | Enomoto ........... B23Q 11/0057 198/495 |
| 6,626,285 B2 * | 9/2003 | Enomoto ........... B23Q 11/0057 198/581 |

(Continued)

FOREIGN PATENT DOCUMENTS

JP 2008-012603 A 1/2008

*Primary Examiner* — Douglas Hess
(74) *Attorney, Agent, or Firm* — IP Business Solutions, LLC

(57) ABSTRACT

A chip discharge device of a machine tool includes a coolant tank storing coolant which is supplied to and dropped from a machining point, and a chip conveyor discharging chips which are generated at and dropped from the machining point, to an outside of the machine tool. A bottom wall of the coolant tank is inclined in a chip discharge side by mounting the coolant tank to the bed.

5 Claims, 6 Drawing Sheets

(56) References Cited

U.S. PATENT DOCUMENTS

| | | | | |
|---|---|---|---|---|
| 6,899,807 B2* | 5/2005 | Cummings | ............ | B01D 29/01 |
| | | | | 210/106 |
| 7,044,696 B2* | 5/2006 | Hiramoto | ................ | B23Q 1/015 |
| | | | | 408/234 |
| 7,364,032 B2* | 4/2008 | Nisiguchi | .......... | B23Q 11/0057 |
| | | | | 198/495 |
| 7,410,569 B1* | 8/2008 | Tilev | .................. | B01D 21/0012 |
| | | | | 210/167.02 |
| 8,029,670 B2* | 10/2011 | Dietenhauser | ......... | B01D 29/01 |
| | | | | 210/232 |
| 9,339,907 B2* | 5/2016 | Matsuyama | ....... | B23Q 11/0057 |
| 9,382,071 B2* | 7/2016 | Matsuyama | ........... | B65G 19/10 |

* cited by examiner

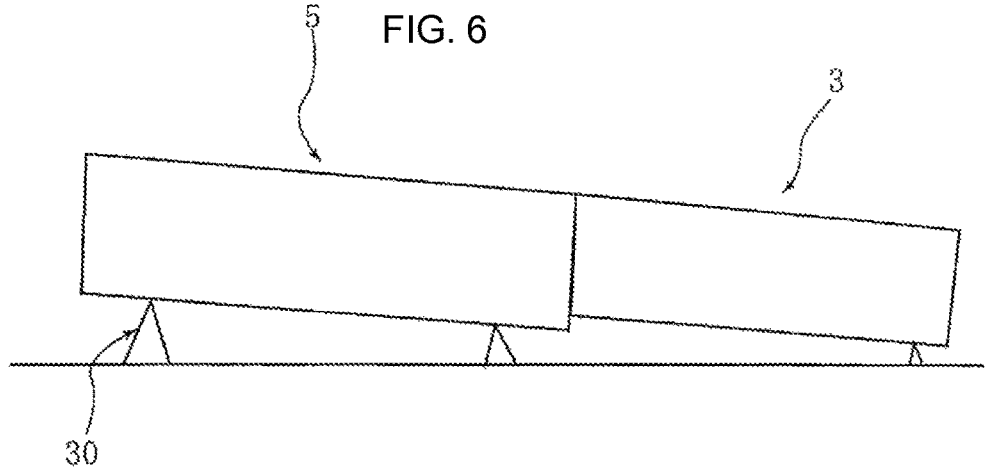
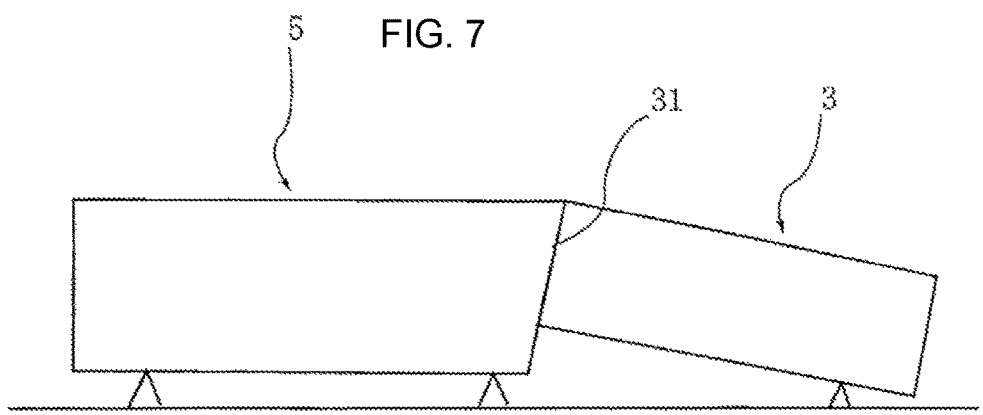

CHIP DISCHARGE DEVICE OF MACHINE TOOL

CROSS-REFERENCE TO RELATED APPLICATIONS

The present application claims priority under 35 U.S.C. 119 to Japanese Patent Application No. 2015-113662, filed on Jun. 4, 2015, the contents of which is incorporated herein by reference in its entirety.

BACKGROUND OF THE INVENTION

Field of the Invention

The present invention relates to a chip discharge device of a machine tool provided with a coolant tank, which stores coolant, and a chip conveyor, which discharges chips to the outside of the machine.

Description of the Related Art

In this kind of chip discharge devices, most of the chips generated by machining a work are discharged to the outside of the machine, but there is a case where a part of the chips, specifically fine powdery chips, is accumulated in a bottom wall of a coolant tank. Therefore, it is necessary to regularly discharge the powdery chips inside the coolant tank, and also, it is necessary to discharge the coolant from the inside of the tank in order to replace the coolant. However, in this discharge process, when the water level of the coolant is close to the bottom wall, it becomes difficult to flow, so that there is a problem that the part of the coolant easily remains inside the tank.

In order to perform the discharge process of such chips or coolant in a short period of time, for example, in Japanese Unexamined Patent Application Publication No. 2008-12603 (see FIG. 4), the configuration in which the bottom wall of the coolant tank is inclined in approximately V-shape is employed.

As such conventional devices, when the configuration in which the bottom wall of the coolant tank is inclined, in comparison with the configuration in which the bottom wall is flat, there are problems that it takes time and effort to provide the inclined bottom wall and the cost increases.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the conventional status noted above, and an object is to provide a chip discharge device of a machine tool which easily performs the discharge process of coolant and chips in a short period of time without causing the problem of an increase in cost.

In some embodiments of the present disclosure, a chip discharge device of a machine tool includes a coolant tank provided in a lower side of a bed and storing coolant which is supplied to a machining point and dropped; and a chip conveyor provided inside the coolant tank and discharging chips, which are generated at the machining point and dropped, to an outside of the machine tool. In the chip discharge device of the machine tool, a bottom wall of the coolant tank is inclined to a chip discharge side by mounting the coolant tank to the bed.

In some embodiments of the present disclosure, in the chip discharge device of the machine tool as recited above, an end part, which is an opposite side of the chip discharge side, of the coolant tank is mounted to the bed.

In some embodiments of the present disclosure, in the chip discharge device of the machine tool as recited above, an inclination angle of the bottom wall is changeable by changing a height position where the end part of the coolant tank is mounted to the bed.

In some embodiments of the present disclosure, in the chip discharge device of the machine tool as recited above, a mounting bracket is formed in the end part of the coolant tank. The mounting bracket is screwed and fixed in a supporting boss part which is formed in an opposite part of the mounting bracket in the bed, and the inclination angle of the bottom wall is changeable by changing a thickness of a shim plate which is interposed between the supporting boss part and the mounting bracket.

According to some embodiments as recited above, with the chip discharge device, the bottom wall of the coolant tank is inclined in the chip discharge side by mounting the coolant tank to the bed. Therefore, the powdery chips included in the coolant are easily accumulated in the discharge side along the inclined bottom wall, so that the chips can be easily discharged in a short period of time without pulling out the coolant tank from the bed to the outside of the machine.

Further, in the replacement work of coolant, although the level of the coolant becomes low, it surely flows to the discharge side, so that it is possible to avoid the situation in which the coolant remains inside the tank.

With this, in the present disclosure, the structure in which the bottom wall is inclined by mounting the coolant tank to the bed is employed, so that it is possible to employ an existing coolant tank having a flat bottom wall, and the production cost can be reduced in comparison with the case in which the bottom wall is manufactured to be an inclined shape as the conventional device.

According to some embodiments as recited above, the end part, which is the opposite side of the discharge side of the coolant tank, is mounted to the bed. Therefore, the bottom wall can be inclined in the discharge side in a simple assembly work in a manner in which the end part, which is the opposite side of the coolant tank, becomes higher than the discharge side.

According to some embodiments as recited above, an inclination angle of the bottom wall is changeable by changing a height position where the coolant tank is mounted to the bed. Therefore, the inclination angle of the bottom wall can be set in a simple method according to properties such as a size, a shape, weight of coolant, or flowability of coolant, etc.

According to some embodiments as recited above, a flange part formed in the end part of the coolant tank is screwed and fixed by a bolt and a shim plate is interposed between the supporting boss part formed in the bed and the flange part. Therefore, an inclination angle of the bottom wall can be easily adjusted in a simple work by changing the thickness or the number of the shim plates.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

The disclosed embodiments of the present invention are shown by way of example, and not limitation, in the accompanying figures.

FIG. 6 is a schematic view of the coolant tank according to the first modification of the embodiment;

FIG. 7 is a schematic view of the coolant tank according to the second modification of the embodiment.

DETAILED DESCRIPTION

Figure 1:
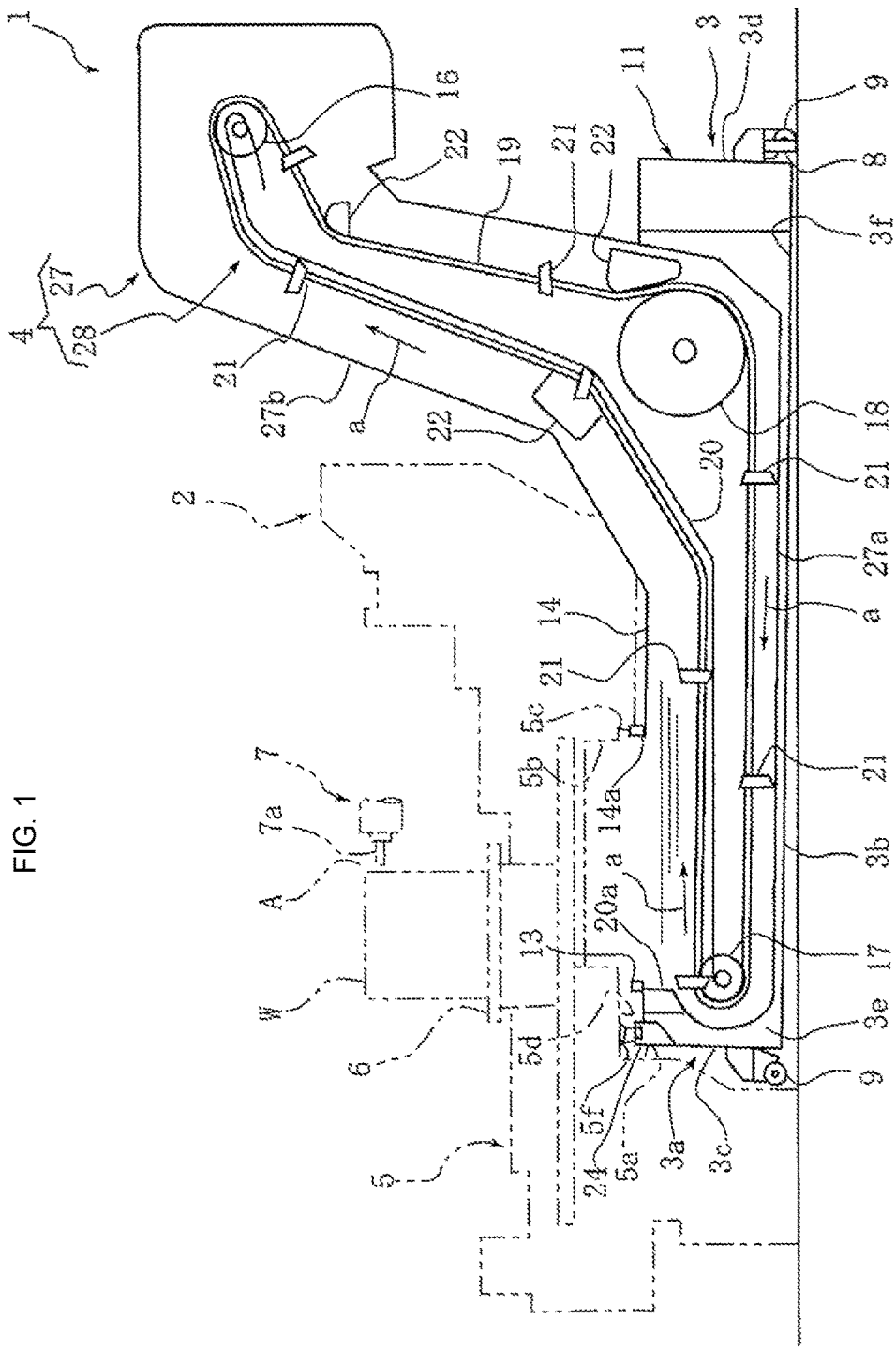
FIG. 1 is a cross-sectional side surface view of a chip discharge device of a machine tool according to embodiment 1 of the present invention.
Figure 2:
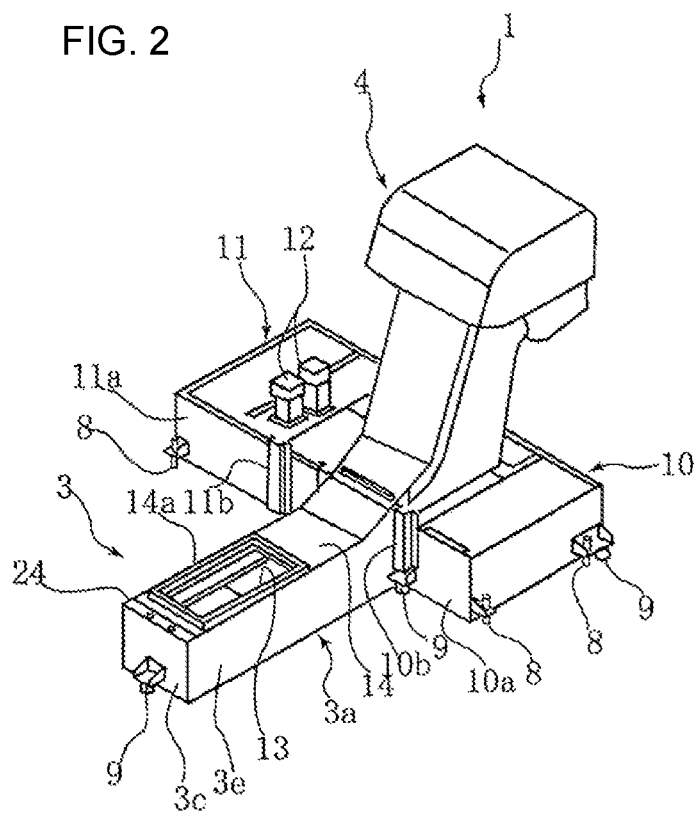
FIG. 2 is a perspective view of the chip discharge device.
Figure 3:
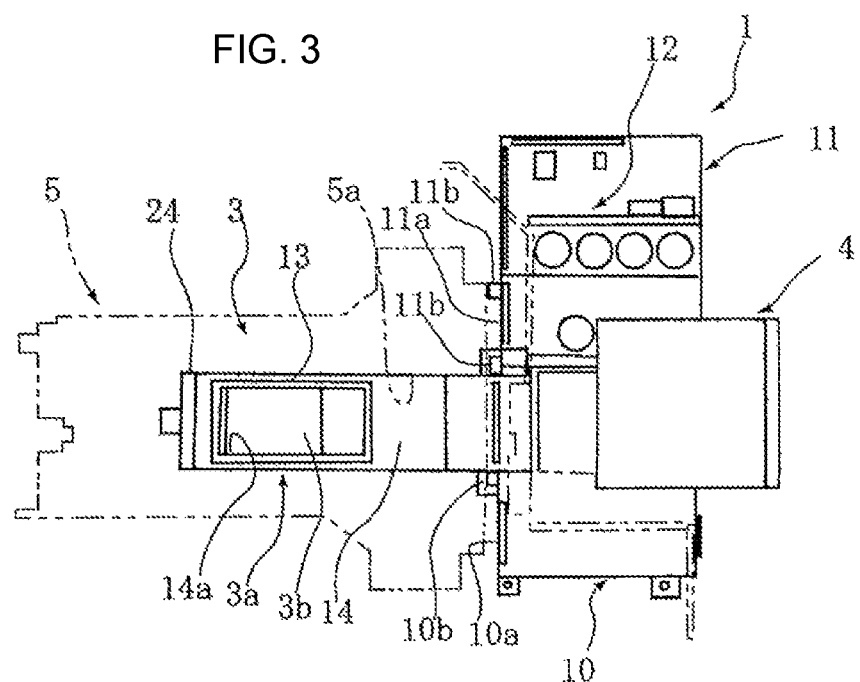
FIG. 3 is a plane view of the chip discharge device.

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described in reference to the drawings.

Embodiment 1

FIGS. 1 to 5 are the drawings to describe a chip discharge device of a machine tool according to embodiment 1 of the present invention. In the present embodiment, the indications "front (forward)", "rear (rearward)", "left" and "right" mean the front, rear, left and right of the machine when viewed from the machine front face.

In the drawings, reference numeral 1 denotes a chip discharge device provided in a machine tool such as a horizontal machining center 2, etc. The chip discharge device 1 is provided with a coolant tank 3, which stores coolant supplied to a machining point A of the horizontal machining center 2 and then dropped, and a chip conveyor 4 provided in a manner in which the lower part of the chip conveyor is stored inside the coolant tank 3 and discharging chips, which are generated at the machining point A and then dropped, to the outside of the machine.

The horizontal machining center 2 has a configuration in which a work W is mounted on a work table 6 provided on a bed 5 and a cutting tool 7a of a spindle device 7 provided on the bed 5 performs a predetermined machining to the work W.

On the bed 5, a recessed part 5a is formed extending from a rear end to a front side, and the chip discharge device 1 is provided in a manner in which the front side of the coolant tank 3 and a lower part 27a of the chip conveyor 4 are placed inside the recessed part 5a. Further, a head opening 5b where the coolant and chips are dropped on the chip conveyor 4 is formed in the lower side of the work table 6 of the bed 5.

The chip conveyor 4 is configured with a casing 27 and a conveyor body 28 provided inside the casing 27.

The casing 27 has a lower part 27a provided inside the coolant tank 3, and a rising part 27b which obliquely and upwardly rises from the coolant tank 3 and continues to the lower part 27a. In a part opposing to the head opening 5b of a lid plate 14 which constitutes the ceiling wall of the lower part 27a, a tank opening 14 is formed.

A seal member 13 made of an elastic material is provided in the peripheral portion of the tank opening 14a of the lid plate 14. Further, an engaging piece part Sc pressing the seal member 13 is formed in the peripheral portion of the head opening 5b of the bed 5, and with this structure, the space between the bed 5 and the casing 27 is sealed.

The conveyor body 28 has a schematic configuration in which endless conveyor chains 19, 19 are wound in right and left drive sprockets 16 provided in the upper end part of the rising part 27b of the casing 27 and right and left driven sprockets 17 provided in the front side end part of the lower part 27a, and scraping plates 21 are provided and bridged in the right and left conveyor chains 19, 19 at predetermined intervals in a moving direction a. Further, the reference numeral 18 denotes a filter separating chips from the coolant. The reference numeral 20 denotes a guide plate which is downwardly provided in the upper side of the right and left conveyor chains 19, so as to receive the dropped chips and slide the scraping plates 21. The reference numeral 22 denotes a guide member which guides the conveyor chains 19 along the casing 27.

The coolant tank 3 is provided with a rectangular parallelepiped tank body 3a which opens upwardly, and a first clean tank 10 and a second clean tank 11 connected with the rear end of the tank body 3a. The coolant filtered by the filter 18 is transferred to the first clean tank 10 and the fine chips are separated by a filter (not shown) inside the first clean tank 10. The coolant separated from the chips is transferred to the second clean tank 11 and from this, it is supplied and circulated to the spindle device 7 by a pump 12.

The tank body 3a is provided with a bottom wall 3b, front and rear side walls 3c, 3d, and right and left side walls 3e, 3e. The front and rear side walls 3c, 3d are connected to the right and left side walls 3e, 3e so as to stand up vertically with respect to the bottom wall 3b, and a simple rectangular parallelepiped tank body in which the upper part opens is configured.

In the lower surface of the bottom wall 3b of the coolant tank 3, a plurality of wheels 9 is provided, so that it is possible to move the coolant tank 3 alone. Further, a jack member 8 is provided to securely fix the coolant tank 3 in a predetermined position.

A mounting bracket 24 is formed in the upper inside part of the front side wall 3c. The mounting bracket 24 includes a ceiling wall part 24a, an inner wall part 24b and a bottom wall part 24c so as to form approximately U-shape. It is welded and fixed to the front side wall 3c. Further, a support member 20a supporting the lower part 27a of the casing 27 is welded and fixed to the inner wall part 24b.

Figure 4:
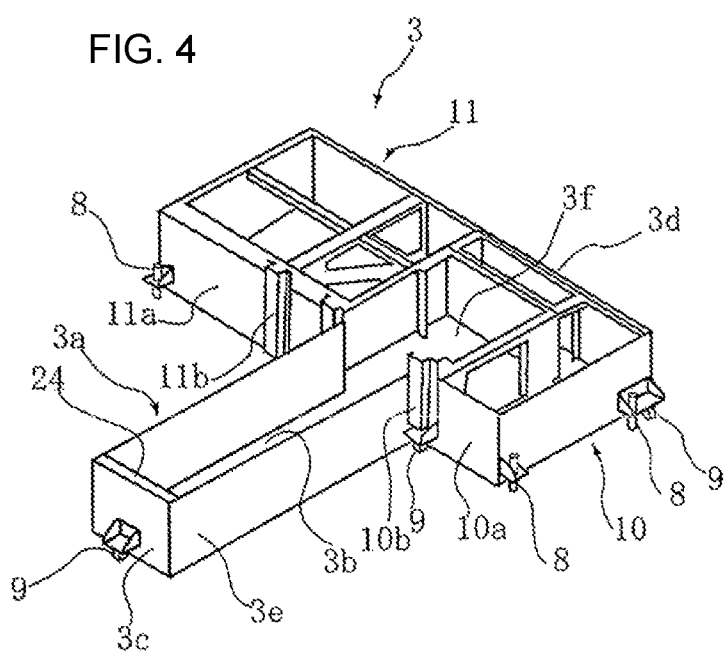
FIG. 4 is a perspective view of a coolant tank of the chip discharge device.
Figure 5:
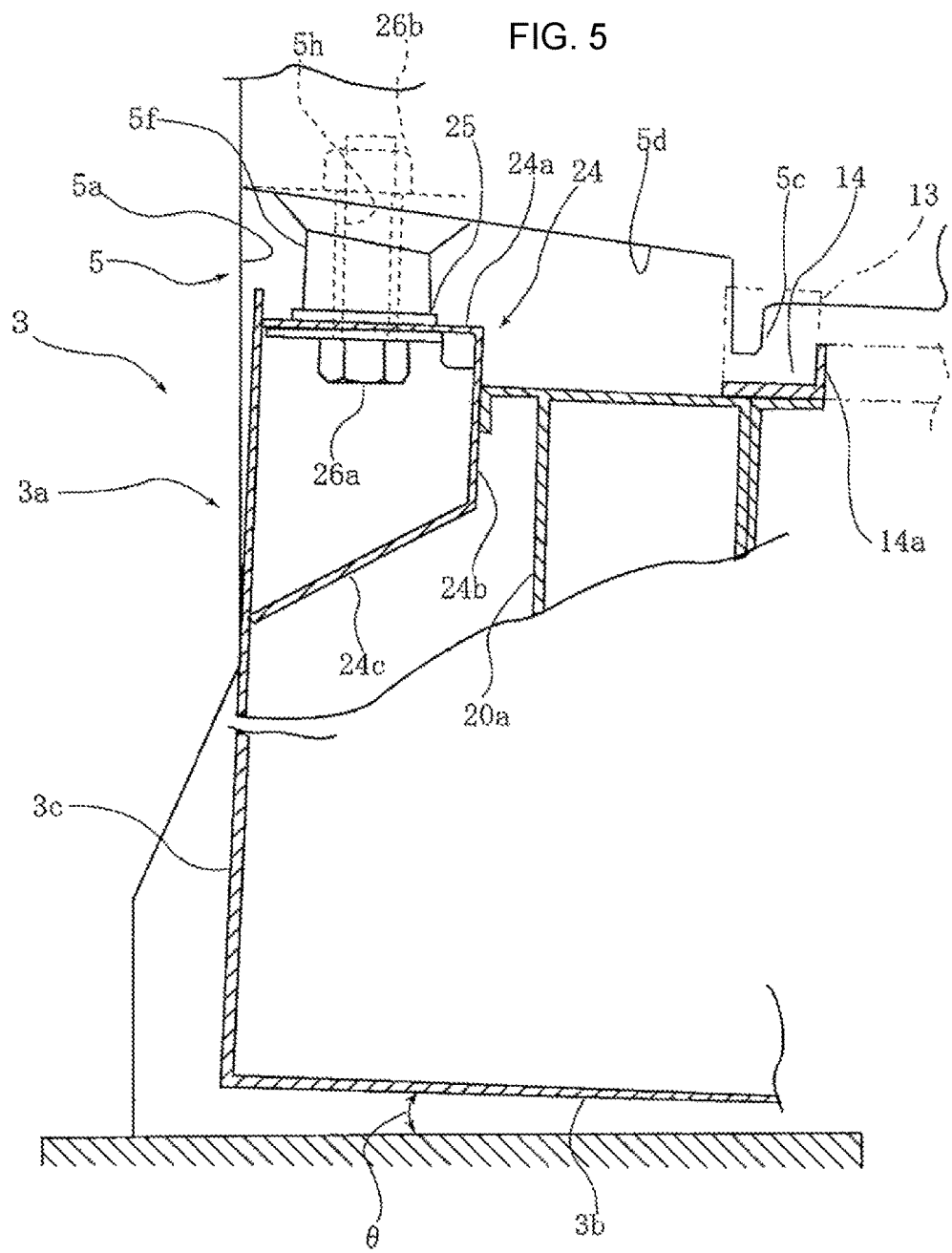
FIG. 5 is a cross-sectional side surface view of a main section of the coolant tank.

As shown in FIGS. 4 and 5, a pair of right and left supporting boss parts 5f, 5f is integrally formed in the part facing to the mounting bracket 24 of the upper wall surface 5d of the recessed part 5a of the bed 5. In the right and left supporting boss parts 5f, a bolt insertion hole 5h is formed, and on its upper surface, a nut 26b is fixed. The mounting bracket 24 is fixed by a bolt 26a inserted from the lower side and screwed by the nut 26b in the state of hanging from the supporting boss parts 5f.

A shim plate 25 having a predetermined thickness is interposed between the lower surface of the right and left supporting boss parts 5f and the ceiling wall part 24a of the mounting bracket 24. By replacing the shim plate 25 with a shim plate having different thickness, or by changing the number of the shim plates, it is possible to change the mounting height of the front side end part of the coolant tank 3 with respect to the bed 5. In this case, the mounting height when the shim plate is not interposed is the highest, and the mounting height becomes lower when the thickness of the shim plate becomes greater or when the number of the shim plates becomes greater.

Further, in the middle part of the longitudinal direction of the coolant tank 3, specifically, in the front side walls 10a, 11a of the first clean tank 10 and the second clean tank 11, center brackets 10b, 11b, 11b are fixed, and it is not shown in the drawings, but each of the center brackets is fixed on the bed 5 in the hanging state.

In addition, the coolant tank 3 is placed in the manner in which the front side wall 3c of the coolant tank becomes higher than the rear side wall 3d by interposing the shim plate 25 between the mounting bracket 24 and the right and left supporting boss parts 5f, and fastening the mounting bracket 24 by the bolt 26a.

With this, the coolant tank 3 is hanged and fixed in the bed 5 in the manner in which the bottom wall 3b of the tank body 3a is inclined so as to become lower toward a discharge side 3f.

Here, the inclination angle $\theta$ of the bottom wall 3b of the tank body 3a is appropriately set based on a size or a shape of the coolant tank 3, precipitation situation of chips, flowability of coolant or chips, etc. Specifically, in this embodiment, the coolant tank 3 is fixed in the manner in which the front side wall 3c of the coolant tank is approximately 10 mm higher than the rear side wall 3d, and as a result, the inclination angle of the bottom wall 3b becomes approximately 0.4 degrees.

According to this embodiment, the bottom wall 3b of the coolant tank 3 is inclined by installing the front side end part, which is positioned in the opposite side of the discharge side 3f of the coolant tank 3, to the bed 5 in the manner in which the discharge side 3f becomes lower. Therefore, during machining the work W, the powdery chips, etc. with the coolant are easily accumulated to the discharge side 3f along the inclined bottom wall 3b by the circulating flow of the coolant during the machining, so that it facilitates discharging the chips in a short period of time without pulling out the coolant tank 3 to the outside of the machine from the lower side of the bed 5.

Further, regarding the coolant replacement work, it prevents the coolant from remaining inside the tank because the coolant surely flows to the discharge side although the coolant level becomes low.

Further, in this embodiment, by a simple work of mounting the coolant tank 3 so that the discharge side 3f becomes lower, the bottom wall 3b is inclined in the manner in which the front side end part becomes higher than the rear side end part. Such structure is employed, so that it is possible to employ an existing coolant tank, as is, having a bottom wall which is not inclined. Therefore, the production cost can reduce in comparison with the case in which the bottom wall of the conventional coolant tank is processed into the inclined shape.

Furthermore, since the inclination angle of the bottom wall can be changed by changing the height of mounting the coolant tank 3 to the bed 5, the inclination angle can be appropriately set in a simple method according to a size or a shape of the coolant tank 3, a precipitation situation of chips inside the coolant tank 3, flowability of chips or coolant, etc.

Further, the mounting bracket 24 formed in the front side end part of the coolant tank 3 is fixed by screwing the bolt and interposing the shim plate 25 between the supporting boss part 5*f* formed in the bed 5 and the mounting bracket. Therefore, the thickness or the number of the shim plate 25 is simply changed such that the inclination angle of the bottom wall can be easily adjusted by a simple work.

In the previous embodiment, the front side wall 3*c* of the coolant tank 3 is mounted to the bed 5 so as to be inclined. However, in the present invention, the front end part of the right and left side walls 3*e*, 3*e* of the coolant tank 3 may be mounted to the bed so as to be inclined.

Further, in the previous embodiment, the front end part of the coolant tank is lifted and mounted to the bed so as to be inclined. However, various modifications of the structure to incline the coolant tank can be considered.

FIG. 6 indicates the first modification of the structure. This is an example that the coolant 3 is connected to the bed 5 with substantially the same angle, and the coolant tank 3 is inclined with the bed 5 by adjusting a jack 30 of the bed 5.

FIG. 7 indicates the second modification of the structure. This is an example that the coolant tank 3 is inclined by inclining a coolant tank fixed surface 31 of the bed 5.

Figure 8:
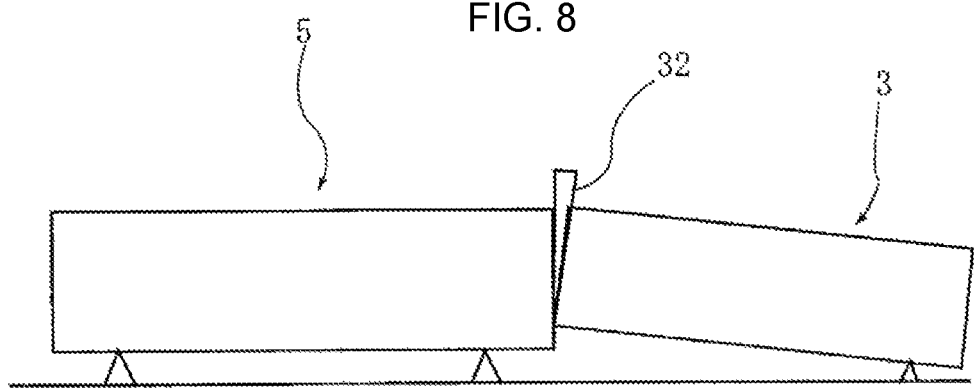
FIG. 8 is a schematic view of the coolant tank according to the third modification of the embodiment.

FIG. 8 indicates the third modification. This is an example that it is inclined by interposing a wedge-shaped member 32 between the bed 5 and the coolant tank 3.

In any of the first to third modifications, it is possible to employ the existing coolant tank as is, and therefore, it is possible to reduce the production cost.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A chip discharge device of a machine tool comprising:
   a coolant tank being provided beneath a bed and storing coolant which is supplied to a machining point and dropped, the coolant tank having a bottom wall; and
   a chip conveyor being provided inside the coolant tank and discharging chips, which are generated at the machining point and dropped, to an outside of the machine tool, wherein
   the bottom wall of the coolant tank is downwardly inclined as the bottom wall extends to a chip discharge side by mounting the coolant tank to the bed.

2. The chip discharge device of the machine tool according to claim 1, wherein
   the coolant tank includes an end part, which is an opposite side of the chip discharge side, and
   the coolant tank is mounted on the bed at the end part.

3. The chip discharge device of the machine tool according to claim 2, wherein
   an inclination angle of the bottom wall is changeable by changing a height position where the end part of the coolant tank is mounted to the bed.

4. The chip discharge device of the machine tool according to claim 3, further comprising:
   a mounting bracket formed at the end part of the coolant tank,
   wherein the mounting bracket is screwed and fixed to a supporting boss part which is formed in an opposite part of the mounting bracket on the bed, and an inclination angle of the bottom wall is changeable by changing a thickness of a shim plate which is interposed between the supporting boss part and the mounting bracket.

5. The chip discharge device of the machine tool according to claim 1, wherein
   the bottom wall includes a chip discharge end and an opposite end being opposite to the chip discharge end, and
   the chip discharge end is closer to the bed in a vertical direction than the opposite end to the bed in the vertical direction.

* * * * *